(12) United States Patent
Galbiati et al.

(10) Patent No.: US 6,420,847 B1
(45) Date of Patent: Jul. 16, 2002

(54) DEVICE FOR DETECTION OF CURRENT OR VOLTAGE ON A PWM DRIVEN WINDING WITH REDUCED JITTER AND RELATED METHODS

(75) Inventors: Ezio Galbiati, Agnadello; Michele Boscolo, Sottomarina; Marco Viti, Cornaredo, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/672,466

(22) Filed: Sep. 28, 2000

(30) Foreign Application Priority Data

Sep. 30, 1999 (EP) .............................................. 99830619

(51) Int. Cl.[7] .................................................. H02P 1/24
(52) U.S. Cl. ........................ 318/727; 318/254; 318/439; 318/811; 318/801; 318/632; 318/771; 318/805; 388/928.1
(58) Field of Search ................................. 318/254, 727, 318/439, 811, 801, 632, 771, 805; 388/928.1

(56) References Cited

U.S. PATENT DOCUMENTS

| 5,517,095 | A |   | 5/1996  | Carbolante et al. ......... 318/254 |
| 5,767,654 | A |   | 6/1998  | Menegoli et al. ........... 318/811 |
| 5,789,895 | A | * | 8/1998  | Lee .............................. 318/811 |
| 5,793,183 | A |   | 8/1998  | Carbolante et al. ......... 318/811 |
| 5,969,491 | A |   | 10/1999 | Viti et al. .................... 318/254 |
| 6,084,364 | A | * | 7/2000  | Mengoli ..................... 318/254 |
| 6,089,768 | A | * | 7/2000  | Barrus et al. ............... 318/254 |
| 6,094,022 | A | * | 7/2000  | Schillaci et al. ............ 318/254 |

* cited by examiner

Primary Examiner—Karen Masih
(74) Attorney, Agent, or Firm—Lisa K. Jorgenson; Allen, Dyer, Doppelt, Milbrath & Gilchrist, P.A.

(57) ABSTRACT

A method for detecting a zero-cross event of an induced back electromotive force (BEMF) or of a nullification instant of a periodic current in a PWM driven winding, by circuits generating an analog signal representative of the induced BEMF or of the nullification instant of the periodic current, comparing the analog signal with zero and producing a first logic signal, generating a PWM driving signal, and storing a time between two consecutive zero-cross events, is provided. The method may include storing a time between a last two zero-cross events and synchronizing the PWM driving signal from a last zero-cross event having a duration equal to a difference between an established time based upon the stored time interval and a first time. If a new zero-cross event is not detected within the established time, switching of the PWM driving signal may be disabled for a time having a maximum duration equal to a second time or until a new zero-cross event is detected.

33 Claims, 5 Drawing Sheets

DEVICE FOR DETECTION OF CURRENT OR VOLTAGE ON A PWM DRIVEN WINDING WITH REDUCED JITTER AND RELATED METHODS

FIELD OF THE INVENTION

The present invention relates to the field of electric motors, and, more particularly, to measuring a voltage or a current in a pulse width modulation ("PWM") switch-driven winding.

BACKGROUND OF THE INVENTION

In devices with PWM switch-driven windings such as static converters or induction machines, it may be necessary to precisely measure the instantaneous value of some significant electrical signal, such as the current or the back electromotive force (BEMF). Specifically, it may be necessary to distinguish the zero-cross events of these generally alternating signals. Detection of a zero current condition in an inductor of a converter is a fundamental requirement for switching on the power device when the current in the inductor has completely decayed. Moreover, the zero-cross event detection of back electromotive forces in the windings of induction motors may be useful to synchronize the phase switchings with the rotor's position to produce the maximum and most uniform torque.

Detection of crossings of predetermined threshold values by alternating electrical signals may be accomplished by shifting the level of the signal by an amount equal to, and of a sign opposite of, the threshold value and detecting the zero-cross events of the level-shifted signal. Given that detection of the crossings of a certain threshold value by an electrical signal is equivalent to detecting the zero-cross events of a suitably level shifted signal, the ensuing description will refer only to the detection of zero-cross events for convenience.

Substantially, the detection of the zero-cross event of a BEMF or of the current flowing in a winding may be similarly carried out for both voltage and current signals. For example, the BEMF may be detected by a comparator coupled to the winding terminals. Furthermore, a zero-cross event of the current may be detected by converting the current signal into a voltage signal using a current sensing resistor in series with the winding and coupling a comparator to the terminals of the current sensing resistor. As will readily be appreciated by those of skill in the art, the problems that may be encountered using such approaches are generally the same and may be addressed in the same manner.

The method of the present invention is useful for detecting signals on PWM-driven windings, and may be implemented in a large number of different devices, such as DC-DC converters, induction machines, and brushless motors, for example. Given that correct reading of the BEMF zero-cross events in sensorless, brushless DC motors is important for correctly determining rotor position, by way of example only, the ensuing discussing will be directed to such a case.

A brushless motor includes a permanent magnet rotor and a stator. The stator includes a number of windings which may be connected in a star configuration, in a polygon (delta) configuration, or even independently from the one another, for example. Star or polygon configurations may have a number of externally accessible terminals equal to the number of phase windings of the motor (and with an additional terminal if the star center is made accessible). In the case of motors with independent phase windings, both terminals of all the phase windings are accessible.

Electronically switched DC motors are widely used in so-called "hard" disk, compact disk ("CD"), and digital video disk ("DVD") drives, and as tape drive motors in video recorders, for example. The driving and control system of a three-phase motor may be an integrated circuit that includes a power stage for driving the phase windings and either a full-wave three-phase half-bridge circuit (in the case of star or triangle connected motors) or three full-bridge circuits (in the case of motors with independently driven windings).

The most common driving mode is referred to as "bipolar," which is where two windings are driven while the third is inactive (e.g., the output of the relative bridge or half-bridge is in a state of high impedance or tristate). The phases are switched according to a cyclic sequence, synchronized with the rotor's instantaneous position. In a bipolar driving system, the instantaneous position may be detected by monitoring the BEMF in the phase winding (which in the current phase is tristate) or by Hall effect sensors (an approach seldom used due to its higher cost). In the case of monitoring the BEMF, it is a common practice to detect the zero-cross events of its periodic waveform.

European patent applications Nos. 96830440.2 and 98202320.2, also assigned to the present assignee, describe different techniques for synchronizing the phase switchings. The comparators that are normally used to monitor the BEMF in question may be gravely affected by the switching noise. In order to prevent the generation of spurious switchings of the outputs of the comparators, masking the outputs of the comparators is typically performed. For example, a suitable masking circuit may be realized with an AND gate having as its inputs the output of the voltage comparator and a masking pulse or signal. This prevents the propagation of a zero-cross event detection signal for a time interval (defined by the duration of the masking pulse) after each phase switching.

It is also common to filter the high frequency noise introduced by the PWM signal on the BEMF and thereafter compare the filtered value with the zero value to enhance the precision of the zero-cross event detection. Yet, this approach introduces phase errors and, in some cases, undesired non-systematic errors. Such errors increase the jitter of the speed of the motor.

SUMMARY OF THE INVENTION

It is therefore an object of the present invention to provide a method for detecting the zero-cross events of an induced voltage or of a current in a PWM driven winding with greater precision.

This and other objects, features, and advantages in accordance with the present invention are provided by a method for detecting the zero-cross events of an induced voltage or of a current in a winding driven by a PWM signal. The method may include storing a time between a last two zero-cross events and synchronizing the PWM driving signal from a last zero-cross event having a duration equal to a difference between an established time based upon the stored time interval and a first time. If a new zero-cross event is not detected within the established time, switching of the PWM driving signal may be disabled for a time having a maximum duration equal to a second time or until a new zero-cross event is detected.

In one embodiment of the present invention, the established time may be equal to the stored time, for example.

While this embodiment is simple to implement, it may be problematic in certain applications due to its sensitivity to variations of the zero-cross events. Moreover, in the case of PWM-driven motors, fabrication asymmetries and other factors may cause spurious sign variations in the succession of zero-cross events.

In a alternate embodiment of the invention, the established time is equal to an arithmetic mean of a plurality of times between consecutive zero-cross events. The plurality of times may be stored in a shift register configured in a first-in-first-out (FIFO) mode. In this way, the established time is substantially free from stochastic errors. In yet another embodiment that is particularly effective in driving motors, the established time may be calculated by applying a linear prediction (for example, a linear regression) or a non-linear (for example, a polynomial regression) method to the plurality of times. Accordingly, discrimination between the different phases of motor function (i.e., acceleration, constant speed, and deceleration) and accurate estimations of the occurrence of threshold crossings are achieved.

Furthermore, the first time interval may be chosen so that the zero-cross events will occur during a second half of a time interval between two consecutive fronts of the PWM driving signal. It is thereby possible in brushless DC sensorless motors, for example, to achieve a significant reduction of motor speed jitter from causes such as fabrication asymmetries of the motor and the like.

A system for driving a polyphase motor based upon zero-cross events of an induced back electromotive force (BEMF) or of the nullification instant of a periodic current may include a comparator of the BEMF or of the nullification instant of periodic current and producing a first logic signal at each zero-cross or null current event, a masking circuit for the first logic signal controlled by a second logic signal and producing a third logic signal, a generator for generating a PWM driving signal and the second logic signal, and a controller monitoring the third logic signal and controlling the generator. The controller may store a time between a last two zero-cross events and synchronize the PWM driving signal from a last zero-cross event having a duration equal to a difference between an established time based upon the stored time interval and a first time. If a new zero-cross event is not detected within the established time, the controller may disable switching of the PWM driving signal for a time having a maximum duration equal to a second time or until a new zero-cross event is detected.

BRIEF DESCRIPTION OF THE DRAWINGS

The various aspects and advantages of the invention will become clear through the following description of the preferred embodiments and the attached drawings, in which.

DETAILED DESCRIPTION OF THE PREFERRED EMBODIMENTS

Figure 1:
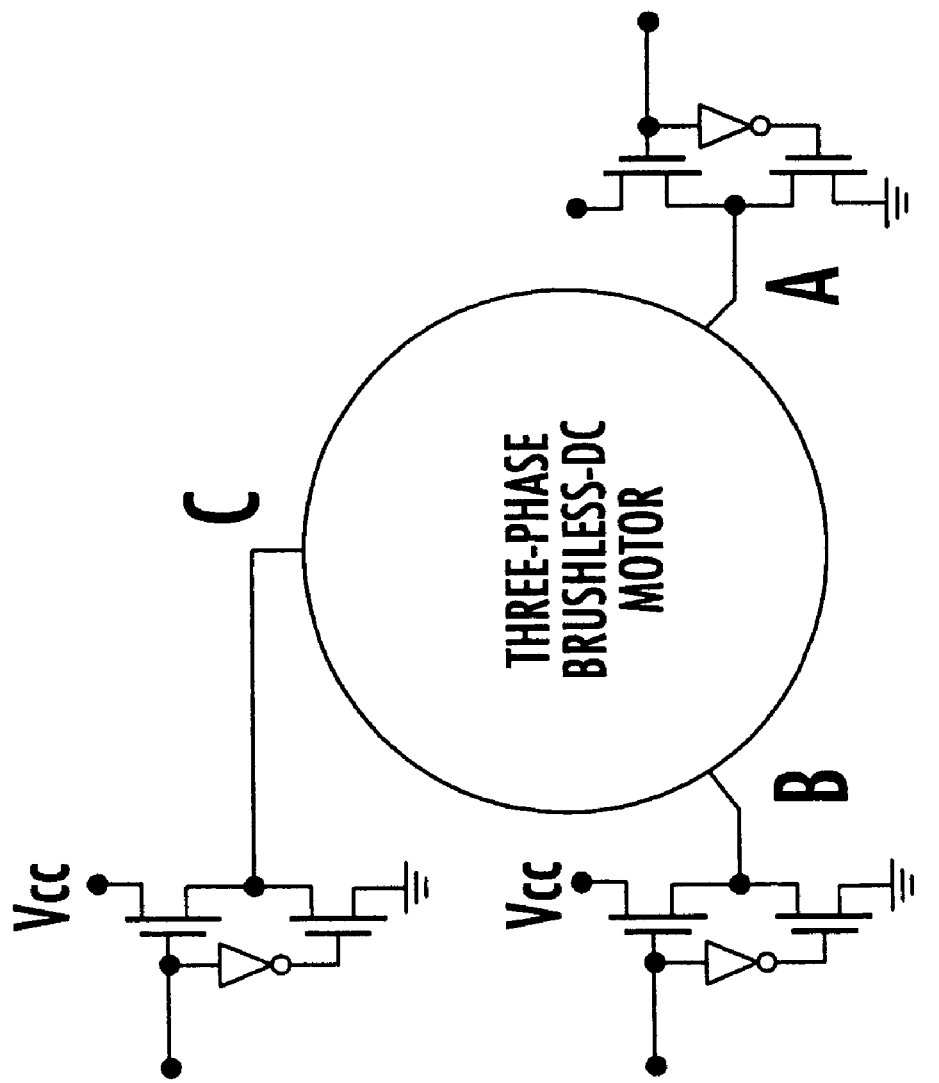
FIG. 1 is a schematic diagram of a full-wave three-phase bridge and a brushless DC three-phase motor connected thereto as in the prior art.

For analyzing embodiments of the invention, reference will be made to a three-phase brushless motor in which the phase switchings are effected through half-bridge output stages, as shown in FIG. 1. The concepts herein presented are also applicable to other polyphase brushless motors with windings connected in a star configuration or other schemes, as will be appreciated by those of skill in the art.

In the case of a DC brushless motor with star connected windings, the BEMF induced on one of the windings may be compared with zero, for example, by coupling a phase winding terminal C and the star center CT to a comparator COMP, as shown in FIG. 2. The comparator COMP produces a logic signal OUTCOMP after having been placed in a high impedance condition (tristate) while a substantially square-wave power signal is applied to the phase winding A with the phase winding B coupled to a reference potential.

Figures 2A, 2B:
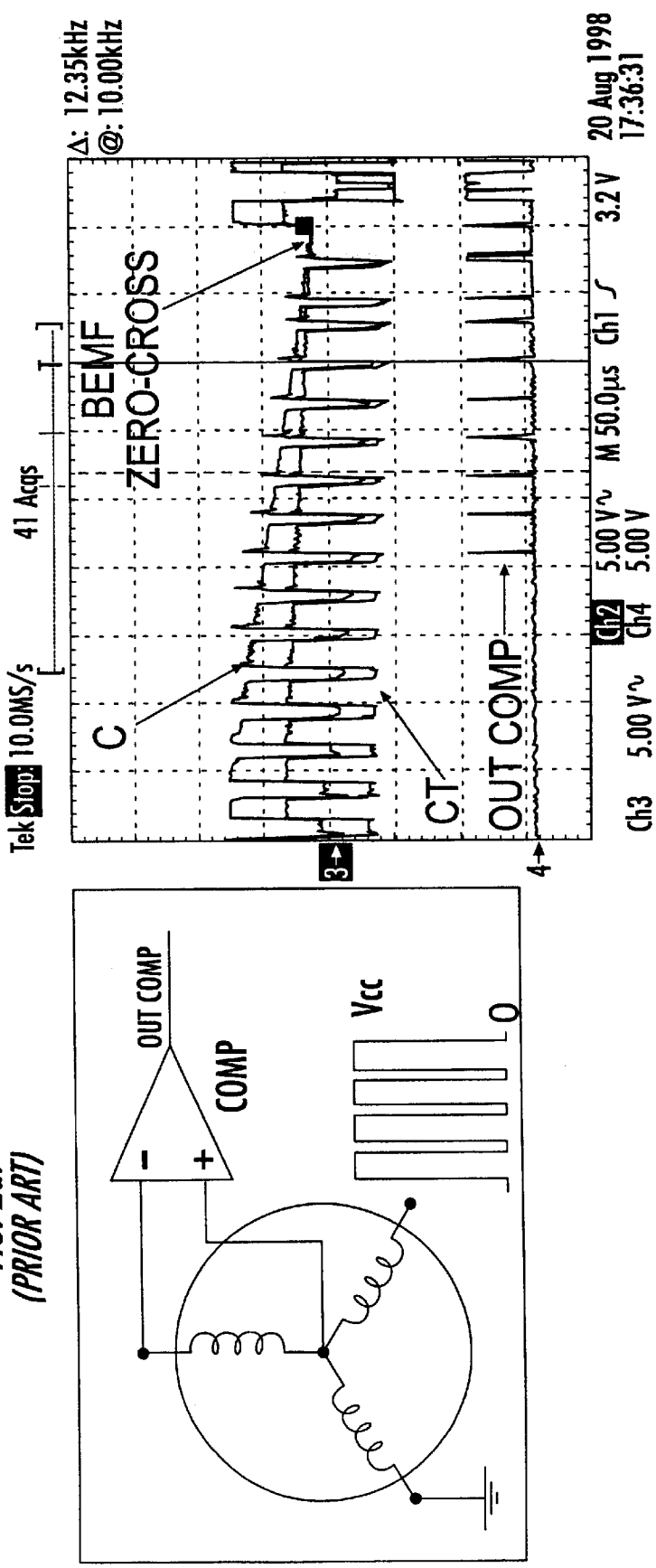
FIG. 2a is a schematic diagram showing the connections between a three-phase brushless motor and a comparator for detecting the zero-cross events of the back electromotive force (BEMF) as in the prior art.
FIG. 2b illustrates the waveforms of the BEMF signal in proximity of a zero-cross event as in the prior art.

FIG. 2b shows the waveforms of the CT voltage as well as of the voltage on the phase winding C. At the instant when these two voltages coincide, the BEMF on the phase winding C is null and the system detects a zero-cross event. Yet, it may be seen that the voltage comparator COMP produces spikes at each switching of the half-bridge power stages in the absence of a masking circuit.

Figure 3:
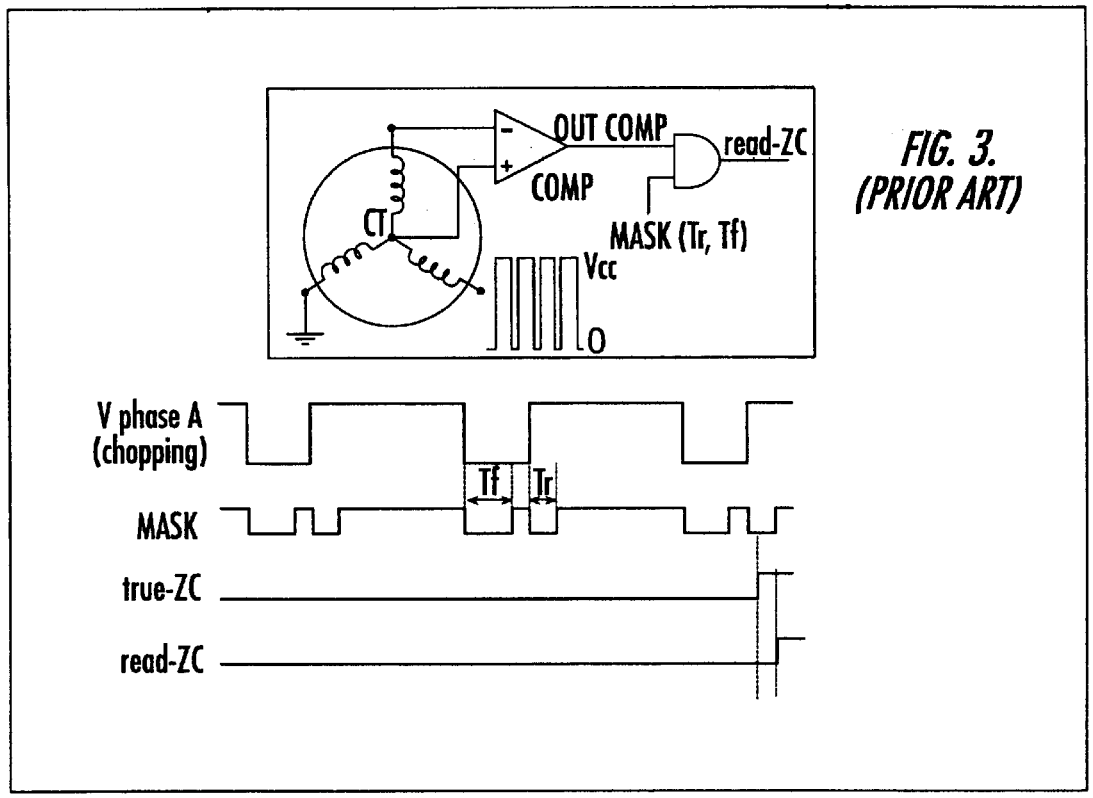
FIG. 3 is a schematic diagram illustrating a masking circuit for masking spurious spikes and a timing diagram illustrating the relative functioning thereof as in the prior art.

To avoid affecting the correctness of the zero-cross event detection, a commonly known circuital solution illustrated in FIG. 3 may be adopted. In cascade with the voltage comparator COMP there is a masking circuit, which in the example shown includes an AND gate having a first input coupled to the output signal OUTCOMP and the other signal coupled to a MASK signal. A diagram of the PWM driving signal of a phase winding and of the masking signal MASK is shown for convenience.

The masking signal MASK has a rising edge at every front of the PWM signal, thus preventing detection of a zero-cross event. That is, if a zero-cross event occurs immediately after a front of the driving PWM signal, as in the example shown in FIG. 3, where the transition of the TRUE_ZC signal that identifies the exact zero-cross event occurs immediately after a rising front of the PWM signal, the zero-cross event will not be immediately detected by the system because the MASK signal is active. Therefore, the zero-cross event will be detected with a certain delay (READ_ZC front) from the time it actually occurs (TRUE_ZC front), i.e., when the MASK signal ceases to exist.

Figure 4A:
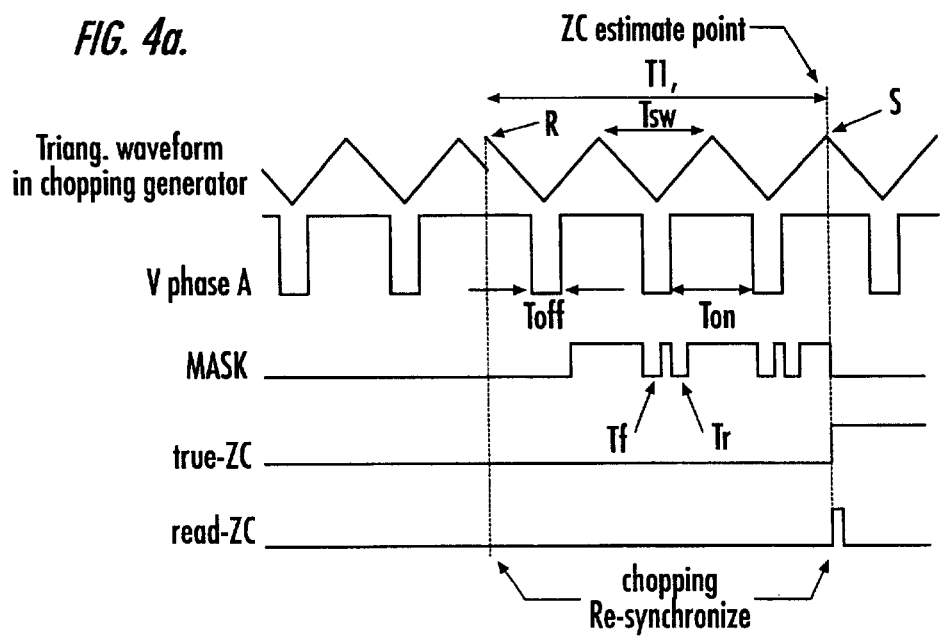
FIG. 4a is a timing diagram illustrating an example of detection of a zero-cross event after an established time according to the present invention.
Figure 4B:
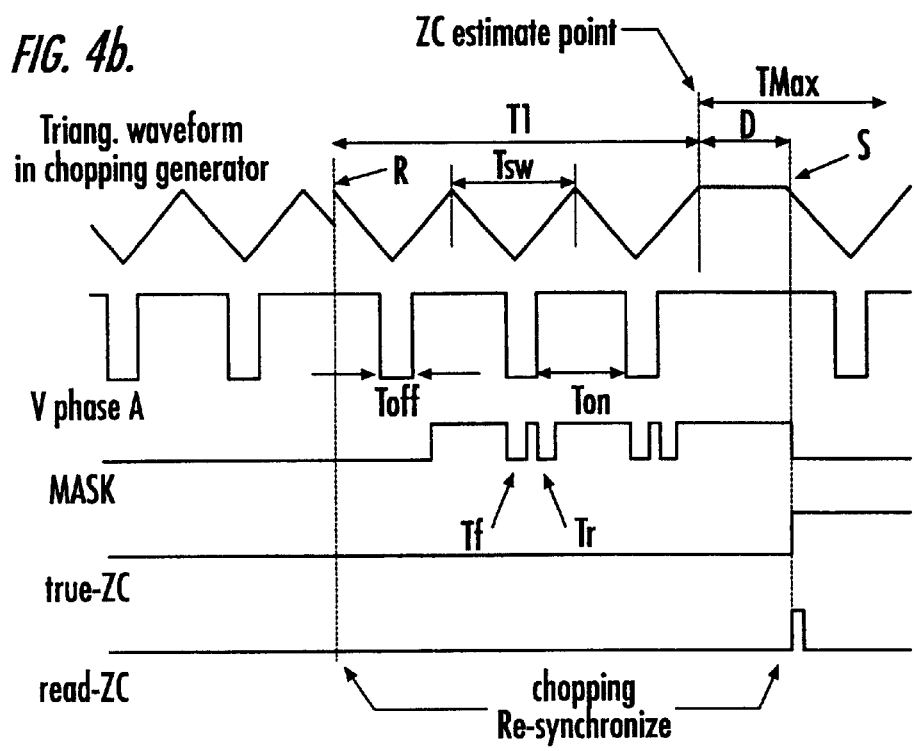
FIG. 4b is a timing diagram illustrating the detection of a zero-cross event that disables the switching of the PWM signal for a time shorter than the allowed maximum time.
Figure 4C:
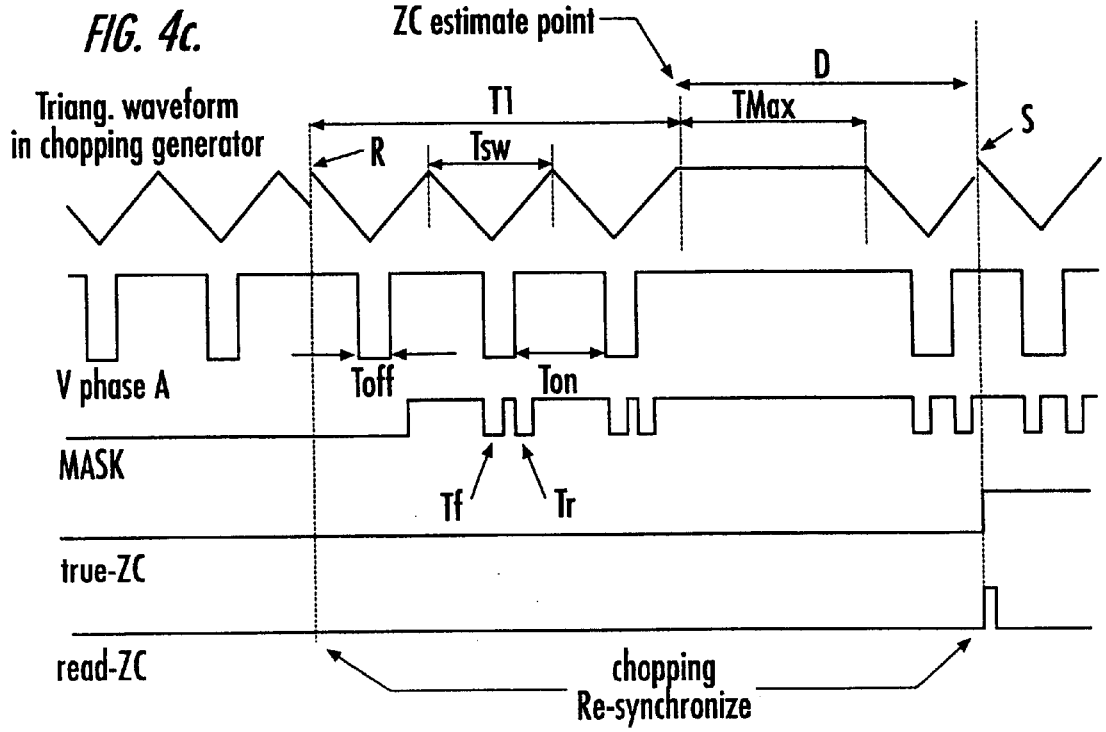
FIG. 4c is a timing diagram illustrating the detection of the zero-cross event that disables the switching of the PWM signal for the entire allowed maximum time.

The way in which the present invention overcomes this problem may be seen in FIGS. 4a, 4b and 4c. These figures illustrate various examples of possible waveforms of the driving voltage applied to a phase winding (V phase A), MASK signals having Tf and Tr intervals effected by the falling and rising edges of the PWM driving signal, a TRUE_ZC signal indicating the occurrence or a zero-cross event, and a READ_ZC signal indicating the detection of the zero-cross event. According to the invention, the occurrence of a next zero-cross event is estimated (ZC-ESTYIMATE_POINT) by calculating the time interval between two consecutive zero-cross event detections. Subsequently, the PWM driving signal is synchronized at a time T1 before the forecasted next TRUE_ZC occurrence, for example, starting from a first predetermined amplitude value R of the triangular wave that generates the PWM signal.

The value of this anticipation interval of the time T1 is preferably shorter than the time interval elapsing between the last two zero-cross events detected. The time T1 may be chosen such that the next estimated zero-cross event does not fall within a masking interval. For example, such a time T1 may be established to be equal to three periods of the PWM signal. The zero-cross event may occur at the estimated time, as illustrated in FIG. 4a, or may be delayed by a time D, shorter or longer than a maximum permitted duration Tmax, as shown in the examples of FIGS. 4b and 4c, respectively.

If the new zero-cross event occurs at the estimated time, as in the example of FIG. 4a, the control circuit simply synchronizes the triangular wave that generates the PWM driving signal, starting from a second predetermined amplitude value S, which may even be equal to the first value R, for example. If the expected zero-cross event does not occur during the interval T1, the system disables the switching of the PWM driving signal. The disabling maintains the configuration of the output stages at the time of ZC_ESTIMATE_POINT until a zero-cross event eventually occurs, as shown in FIG. 4b, or otherwise until a maximum time interval TMAX has elapsed, as shown in FIG. 4c. Thereafter, the control circuit synchronizes the driving PWM signal by restarting the triangular wave that generates it.

Disabling switching of the PWM driving signal provides a wait state or safety band within which the zero-cross event may occur and still be immediately detected, thereby enhancing system precision. The zero-cross events may otherwise be subject to unpredictable phase shifts due to construction asymmetries of the motor, for example. That is, if the switching of the PWM signal is not disabled, a zero-cross event may occur immediately following a front of the PWM signal itself, in which case the zero-cross event of the BEMF would occur during a masking interval and be detected only at the end of the masking interval.

In order to minimize the jitter caused by inevitable asymmetries of the motor, the synchronism of the PWM driving signal may be forced to a predetermined value S even at an instant where the real zero-cross event is detected. Hence, the output bridge configuration is systematically corrected at those instances in which the actual rotor position is known. This procedure improves the general behavior of the system.

Figure 5:
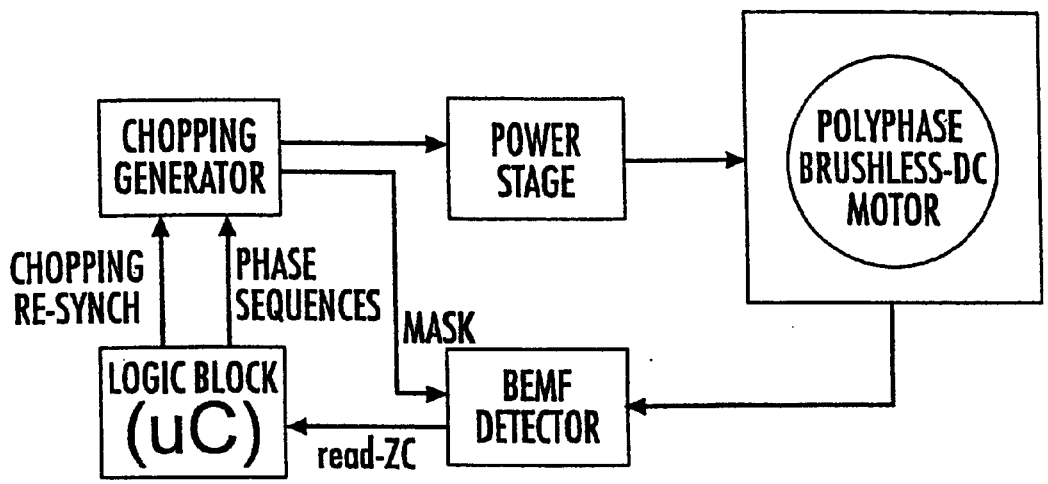
FIG. 5 is a schematic block diagram illustrating a first embodiment of the invention applied to a brushless DC polyphase motor.

A schematic block diagram of a device according to the present invention is shown in FIG. 5. This embodiment pertains to a brushless DC polyphase motor powered by a power stage. A chopping generator drives the power stage and generates the MASK signal, and a back electromotive force sensing circuit BEMF_DETECTOR coupled to the brushless motor produces a logic pulse READ_ZC at every detected zero-cross event. A microcontroller µC controls the synchronization and the application of the PWM driving signal to the phase windings by the commands CHOPPING_RE and PHASE_SEQUENCE, respectively. The microcontroller µC also stores the interval TC between successive zero-cross events, calculates the expected occurrence of a new zero-cross event, and affects a synchronization of the chopping generator at an anticipated time T1 before the expected zero-cross event.

Figure 6:
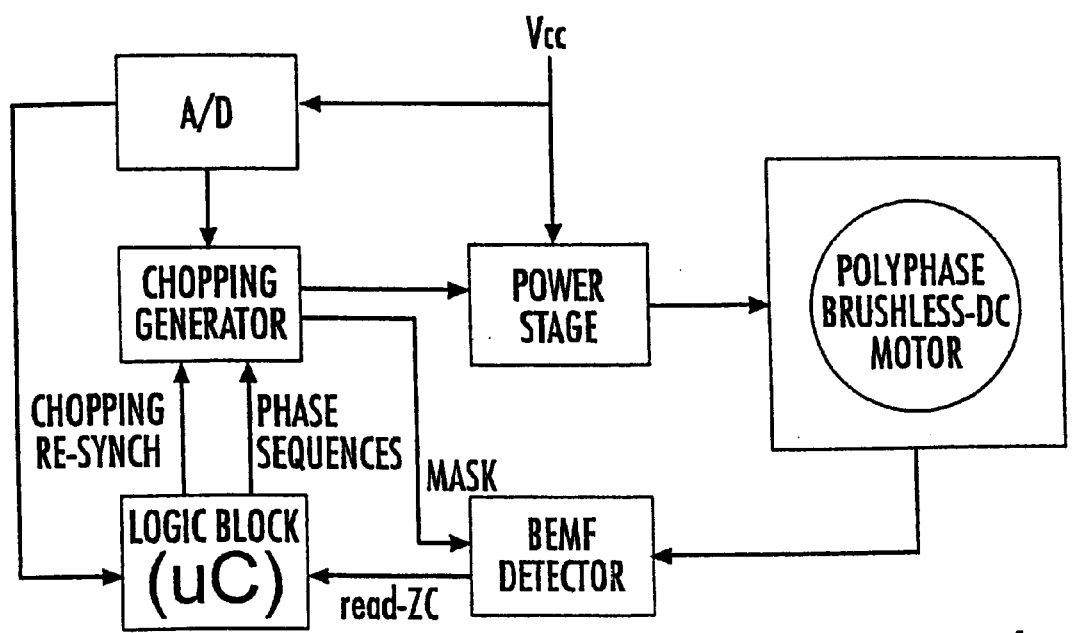
FIG. 6 is a schematic block diagram illustrating another embodiment of the present invention applied to a brushless DC polyphase motor.

Another schematic block diagram of an alternate embodiment of the present invention is shown in FIG. 6. The block diagram is similar to the one illustrated in FIG. 5 and further includes a system for compensating eventual variations of the supply voltage. This additional system includes an analog-to-digital ("A/D") converter connected to the supply voltage, the output of which is read by the controller that compensates voltage variations. The output of the A/D converter is used to compute the time interval T1 as well as the predetermined values R and S of the triangular waveform of the PWM generator.

That which is claimed is:

1. A method for detecting a zero-cross event of an induced back electromotive force (BEMF) or of a nullification instant of a periodic current in a PWM driven winding, by circuits generating a signal representative of the induced BEMF or of the nullification instant of the periodic current, comparing the signal and producing a first logic signal, generating a PWM driving signal, and storing a time between two consecutive zero-cross events, the method comprising:

storing a time between a last two zero-cross events;

synchronizing the PWM driving signal from a last zero-cross event having a duration equal to a difference between an established time based upon the stored time interval and a first time; and if a new zero-cross event is not detected within the established time, disabling switching of the PWM driving signal for a time having a maximum duration equal to the lesser of a second time and a time until a new zero-cross event is detected.

2. The method of claim 1 wherein synchronizing comprises setting the established time to be equal to the stored time.

3. The method of claim 1 wherein storing comprises storing a plurality of times between consecutive zero-cross events.

4. The method of claim 3 wherein synchronizing comprises setting the established time to be equal to an arithmetic mean of the plurality of times.

5. The method of claim 3 wherein synchronizing comprises calculating the established time from the plurality of times using a linear regression method.

6. The method of claim 3 wherein synchronizing comprises calculating the established time from the plurality of times using a non-linear regression method.

7. The method of claim 1 wherein the first time is chosen so that the zero-cross events occur during a second half of an interval between successive driving fronts of the PWM driving signal.

8. A method for driving a winding with a PWM driving signal based upon detecting zero-cross events, the method comprising:

storing a time between a two last zero-cross events;

synchronizing the PWM driving signal from a last zero-cross event having a duration based upon an established time, the established time being based upon the stored time; and if a new zero-cross event is not detected within the established time, disabling switching of the PWM signal for a time having a duration equal to the lesser of a first time and a time until a new zero-cross event is detected.

9. The method of claim 8 wherein synchronizing comprises setting the established time to be equal to the stored time.

10. The method of claim 8 wherein storing comprises storing a plurality of times between consecutive zero-cross events.

11. The method of claim 10 wherein synchronizing comprises setting the established time to be equal to an arithmetic mean of the plurality of times.

12. The method of claim 10 wherein synchronizing comprises calculating the established time from the plurality of times using a linear regression method.

13. The method of claim 10 wherein synchronizing comprises calculating the established time from the plurality of times using a non-linear regression method.

14. The method of claim 8 wherein the duration is equal to a difference between the established time and a second time; and wherein the second time is chosen so that the zero-cross events occur during a second half of an interval between successive driving fronts of the PWM driving signal.

15. A system for driving a polyphase motor based upon zero-cross events of an induced back electromotive force (BEMF) or of the nullification instant of a periodic current, the system comprising:
  a comparator of the induced BEMF or of the nullification instant of the periodic current and producing a first logic signal at each zero-cross event;
  a masking circuit for said first logic signal controlled by a second logic signal and producing a third logic signal;
  a PWM driving signal generator for generating a PWM driving signal and the second logic signal; and
  a controller monitoring the third logic signal and controlling said PWM driving signal generator, said controller storing a time between a two last zero-cross events, synchronizing the PWM driving signal from a last zero-cross event having a duration based upon an established time, the established time being based upon the stored time, and
  if a new zero-cross event is not detected within the established time, disabling switching of the PWM signal for a time having a duration equal to the lesser of a first time and a time until a new zero-cross event is detected.

16. The system of claim 15 wherein the polyphase motor comprises a sensorless and brushless polyphase motor.

17. The system of claim 15 further comprising an output stage connected between said PWM driving signal generator and the windings of the polyphase motor.

18. The system of claim 15 wherein the established time equals the stored time.

19. The system of claim 15 wherein the controller stores a plurality of times between consecutive zero-cross events.

20. The system of claim 19 wherein the established time equals an arithmetic mean of the plurality of times.

21. The system of claim 19 wherein the controller calculates the established time from the plurality of times using a linear regression method.

22. The system of claim 19 wherein the controller calculates the established time from the plurality of times using a non-linear regression method.

23. The system of claim 19 wherein the controller further comprises a register configured in a first-in first-out mode for storing the plurality of times.

24. The system of claim 15 wherein the duration is equal to a difference between the established time and a second time; and wherein the second time is chosen so that the zero-cross events occur during a second half of an interval between successive driving fronts of the PWM driving signal.

25. A system for driving a polyphase motor based upon zero-cross events and comprising:
  a PWM driving signal generator for a PWM driving signal; and
  a controller for controlling said PWM driving signal generator, said controller further
    storing a time between a two last zero-cross events,
    synchronizing the PWM driving signal from a last zero-cross event having a duration based upon an established time, the established time being based upon the stored time, and
    if a new zero-cross event is not detected within the established time, disabling switching of the PWM signal for a time having a duration equal to the lesser of a first time and a time until a new zero-cross event is detected.

26. The system of claim 25 wherein the polyphase motor comprises a sensorless and brushless polyphase motor.

27. The system of claim 25 wherein the established time equals the stored time.

28. The system of claim 25 wherein the controller stores a plurality of times between consecutive zero-cross events.

29. The system of claim 28 wherein the established time equals an arithmetic mean of the plurality of times.

30. The system of claim 28 wherein the controller calculates the established time from the plurality of times using a linear regression method.

31. The system of claim 28 wherein the controller calculates the established time from the plurality of times using a non-linear regression method.

32. The system of claim 28 wherein the controller further comprises a register configured in a first-in first-out mode for storing the plurality of times.

33. The system of claim 25 wherein the duration is equal to a difference between the established time and a second time; and wherein the second time is chosen so that the zero-cross events occur during a second half of an interval between successive driving fronts of the PWM driving signal.

* * * * *